US010218451B2

United States Patent
Kim et al.

(10) Patent No.: US 10,218,451 B2
(45) Date of Patent: Feb. 26, 2019

(54) COMMUNICATION DEVICE FOR PERFORMING CARRIER SEARCH IN TD-SCDMA SYSTEM AND METHOD OF CONTROLLING SAME

(71) Applicants: Do-Yun Kim, Gyeonggi-do (KR); Hyun-Seok Yu, Seoul (KR); Won-Seok Park, Seoul (KR); Jeong-Gyun Yu, Gyeonggi-do (KR); Chae-Hag Yi, Gyeonggi-do (KR)

(72) Inventors: Do-Yun Kim, Gyeonggi-do (KR); Hyun-Seok Yu, Seoul (KR); Won-Seok Park, Seoul (KR); Jeong-Gyun Yu, Gyeonggi-do (KR); Chae-Hag Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 237 days.

(21) Appl. No.: 15/094,231

(22) Filed: Apr. 8, 2016

(65) Prior Publication Data

US 2017/0099116 A1 Apr. 6, 2017

(30) Foreign Application Priority Data

Oct. 1, 2015 (KR) .................. 10-2015-0138416

(51) Int. Cl.
*H04B 17/318* (2015.01)
*H04L 27/26* (2006.01)
*H04W 8/00* (2009.01)
*H04W 24/08* (2009.01)
*H04W 48/16* (2009.01)

(52) U.S. Cl.
CPC ....... *H04B 17/318* (2015.01); *H04L 27/2665* (2013.01); *H04W 8/005* (2013.01); *H04W 24/08* (2013.01); *H04W 48/16* (2013.01)

(58) Field of Classification Search
CPC .... H04B 17/318; H04W 48/16; H04W 8/005; H04W 24/08
See application file for complete search history.

(56) References Cited

U.S. PATENT DOCUMENTS

| 2005/0075125 | A1 | 4/2005 | Bada et al. | |
| 2007/0189229 | A1 | 8/2007 | Li et al. | |
| 2012/0195264 | A1* | 8/2012 | Taoka | H04B 7/0434 370/328 |
| 2015/0146627 | A1* | 5/2015 | Ananda | H04W 48/16 370/329 |

* cited by examiner

*Primary Examiner* — Bo Hui A Zhu
(74) *Attorney, Agent, or Firm* — The Farrell Law Firm, P.C.

(57) ABSTRACT

A communication device and method operating in a wireless communication system is provided. The communication device includes a memory configured to store frequency history information; and a processor electrically connected to the memory, wherein the processor is configured to measure reception power of each of a plurality of first signals included in a first band, determine a first candidate frequency set according to a strength of each measured reception power, determine a second candidate frequency set updated from the first candidate frequency set based on the frequency history information, and determine whether a cell corresponding to each frequency included in the second candidate frequency set exists.

20 Claims, 5 Drawing Sheets

|  | TS0 freq | UL/DL freq | TS0 power | UL/DL freq | freq scan result |
|---|---|---|---|---|---|
| case 1 | f0 | f0 | high | high | f0 |
| case 2 | f0 | f0 | low | high | f0 |
| case 3 | f0 | f0 | high | low | f0 |
| case 4 | f0 | f0 | low | low | – |
| case 5 | f1 | f2 | high | high | f1, f2 |
| case 6 | f1 | f2 | low | high | f2 |
| case 7 | f1 | f2 | high | low | f1 |
| case 8 | f1 | f2 | low | low | – |

COMMUNICATION DEVICE FOR PERFORMING CARRIER SEARCH IN TD-SCDMA SYSTEM AND METHOD OF CONTROLLING SAME

PRIORITY

This application claims priority under 35 U.S.C. § 119(a) to a Korean Patent Application filed on Oct. 1, 2015 in the Korean Intellectual Property Office and assigned Serial No. 10-2015-0138416, the entire content of which is incorporated herein by reference.

BACKGROUND

1. Field of the Disclosure

The present disclosure relates generally to a communication device and a method of controlling the same, and more particularly, to a communication device for performing a carrier search to search for a cell in a time division duplex based (TDD-based) wireless communication system and a method of controlling the same.

2. Description of the Related Art

In a time division synchronous code division multiple access (TD-SCDMA) system corresponding to a TDD system, a method of searching for a carrier is generally performed based on reception power.

SUMMARY

According to an aspect of the present disclosure, a communication device is provided, which may determine a candidate frequency for a cell search based on reception power and frequency history information while supporting a wide bandwidth through a single reception (Rx) path, so as to perform a rapid and accurate cell search.

According to another aspect of the present disclosure, a method of controlling a communication device is provided, which may determine a candidate frequency for a cell search based on reception power and frequency history information while supporting a wide bandwidth through a single Rx path, so as to perform a rapid and accurate cell search.

According to another aspect of the present disclosure, a user equipment (UE) including a communication device is provided which may determine a candidate frequency for a cell search based on reception power and frequency history information while supporting a wide bandwidth through a single Rx path, so as to perform a rapid and accurate cell search.

According to another aspect of the present disclosure, a method of controlling a UE including a communication device is provided, which may determine a candidate frequency for a cell search based on reception power and frequency history information while supporting a wide bandwidth through a single Rx path, so as to perform a rapid and accurate cell search.

According to another aspect of the present disclosure, a method is provided for performing a rapid and accurate carrier search and/or cell search by determining a candidate frequency for a cell search based on reception power and frequency history information while supporting a wide bandwidth through a single Rx path (for example, a long term evolution (LTE) wide bandwidth).

In accordance with an aspect of the present disclosure, a communication device operating in a wireless communication system is provided. The communication device includes a memory configured to store frequency history information; and a processor electrically connected to the memory, wherein the processor is configured to measure reception power of each of a plurality of first signals included in a first band, determine a first candidate frequency set according to a strength of each measured reception power, determine a second candidate frequency set updated from the first candidate frequency set based on the frequency history information, and determine whether a cell corresponding to each frequency included in the second candidate frequency set exists.

In accordance with another aspect of the present disclosure, a method of controlling a communication device operating in a wireless communication system is provided. The method includes receiving a plurality of first signals included in a first band; measuring reception power of each of the plurality of first signals; determining a first candidate frequency set according to a strength of each measured reception power; determining a second candidate frequency set updated from the first candidate frequency set based on frequency history information; and determining whether a cell corresponding to each frequency included in the second candidate frequency set exists.

In accordance with another aspect of the present disclosure, a UE operating in a wireless communication system is provided. The UE includes a display; an input/output interface; and a communication device, wherein the communication device includes a memory configured to store frequency history information; and a processor electrically connected to the memory, wherein the processor is configured to measure reception power of each of a plurality of first signals included in a first band, determine a first candidate frequency set according to a strength of each measured reception power, determine a second candidate frequency set updated from the first candidate frequency set based on the frequency history information, and determine whether a cell corresponding to each frequency included in the second candidate frequency set exists.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figures 1A, 1B:
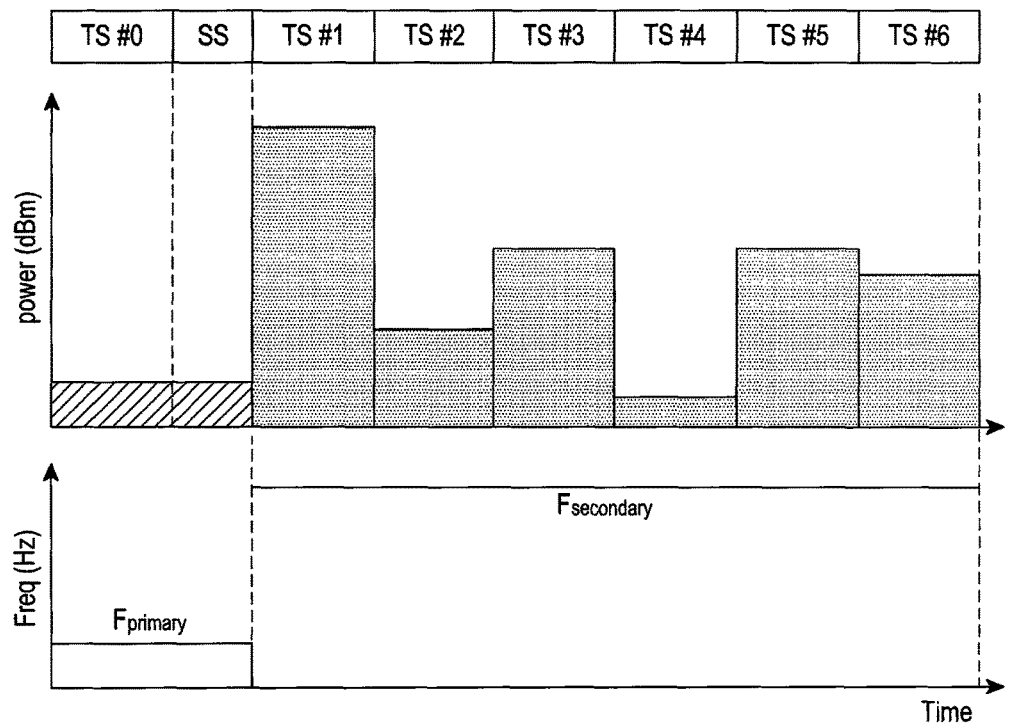
FIGS. 1A and 1B are illustrations of performing a cell search based on reception power.

Hereinafter, various embodiments of the present disclosure are described with reference to the accompanying drawings. However, it should be understood that there is no intent to limit the present disclosure to the particular embodiments disclosed herein; rather, the present disclosure is intended to be construed to cover various modifications, equivalents, and/or alternatives of embodiments of the present disclosure. In the accompanying drawings, similar reference numerals may be used to designate similar elements.

As used herein, the terms "have," "may have," "include," or "may include" refer to the existence of a corresponding feature (e.g., numeral, function, operation, or element such as a component), but do not exclude one or more additional features.

In the present disclosure, the terms "A or B," "at least one of A and/or B," and "one or more of A and/or B" may include all possible combinations of the items listed. For example, the terms "A or B," "at least one of A and B," and "at least one of A or B" refer to all of (1) including at least one A, (2) including at least one B, and (3) including all of at least one A and at least one B.

The terms "a first," "a second," "the first," or "the second" used in an embodiment of the present disclosure may modify various components regardless of the order and/or the importance, but do not limit the corresponding components. For example, a first user device and a second user device indicate different user devices although both of them are user devices. For example, a first element may be referred to as a second element, and similarly, a second element may be referred to as a first element without departing from the scope and spirit of the present disclosure.

It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposer there between. In contrast, it may be understood that when an element (e.g., a first element) is referred to as being "directly connected," or "directly coupled," to another element (e.g., a second element), there is no element (e.g., a third element) interposed there between.

The term "configured to" used in the present disclosure may be used interchangeably with, for example, "suitable for," "having the capacity to," "designed to," "adapted to," "made to," or "capable of," according to the situation. The term "configured to" may not necessarily imply "specifically designed to" in hardware. Alternatively, in some situations, the expression "device configured to" may indicate that the device, together with other devices or components, "is able to." For example, the term "control module adapted (or configured) to perform A, B, and C" may indicate a dedicated control module (e.g. an embedded control module) for only performing a corresponding operation or a a general purpose control module (e.g., a central processing unit (CPU) or an application processor (AP)) that may perform the corresponding operation by executing one or more software programs stored in a storage module device.

The terms used herein are merely for the purpose of describing particular embodiments and are not intended to limit the scope of the present disclosure. As used herein, singular forms may include plural forms unless the context clearly indicates otherwise. Unless defined otherwise, all terms used herein, have the same meanings as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even a term defined in the present disclosure is not intended to be interpreted to exclude an embodiment of the present disclosure.

A communication device and a UE according to an embodiment of the present disclosure is described below with reference to the accompanying drawings. In the present disclosure, the term "user" may refer to a person who uses a communication device, a device (for example, an artificial intelligence device) which uses a communication device, a person who uses a UE, or a device which uses a UE.

FIGS. 1A and 1B are illustrations of searching for a carrier based on reception power.

Referring to FIGS. 1A and 1B, case 1 to case 4 show frequency scan results (in other words, a fast Fourier transform (FFT) result) for a 1-frequency network in a TD-SCDMA system, and case 5 to case 8 show frequency scan results for an N-frequency network in a TD-SCDMA system. An N-frequency network may refer to a network in which a primary frequency and a secondary frequency are different from each other as illustrated in FIGS. 1A and 1B. The secondary frequency may be referred to as a working frequency. If a carrier search is performed based on reception power, frequency scan results may be derived as illustrated in FIGS. 1A and 1B.

For a cell search in an N-frequency network of a TD-SCDMA system, a carrier search is performed based on only reception power, and a secondary frequency f2 may be determined as a frequency for the cell search in case 6 of FIGS. 1A and 1B. A cell search may be performed based on a secondary frequency, which makes an accurate cell search difficult.

Further, a device, which supports a wide bandwidth through a single Rx path to receive a TD-SCDMA signal (for example, to receive a TD-SCDMA signal using an LTE bandwidth), may not be provided.

Figure 2A:
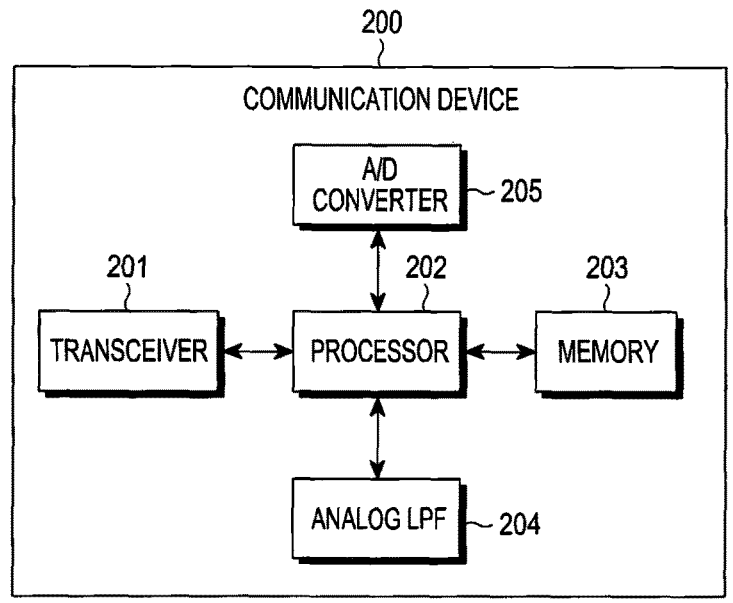
FIG. 2A is a block diagram of a communication device according to an embodiment of the present disclosure.

FIG. 2A is a block diagram of a communication device 200 according to an embodiment of the present disclosure.

Referring to FIG. 2A, the communication device 200 may include at least one of a transceiver 201, a processor 202, a memory 203, an analog low pass filter (LPF) 204, and an analog to digital (A/D) converter 205. In an alternate embodiment of the present disclosure, the transceiver 201 may be external to the communication device 200.

The transceiver 201 may configure communication between, for example, the communication device 200 and an external device (for example, a first external electronic device 230, a second external electronic device 240, or a server 250 in FIG. 2B described below). For example, the transceiver 201 may be connected to a network 220 in FIG. 2B described below through wireless communication or wired communication, so as to communicate with the external device or the server. The term "transceiver" is interchangeable with terms such as "communication module" and "communication interface."

The wireless communication may use at least one of, for example, LTE, LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. Further, the wireless communication may include, for example, short-range communication. Short-range communication may include at least one of, for example, wireless fidelity (Wi-Fi), Bluetooth, near field communication (NFC), and global navigation satellite system (GNSS). The GNSS may include at least one of, for example, a global positioning system (GPS), a global navigation satellite system (Glonass), a BeiDou Navigation Satellite System (BeiDou), and a European global satellite based navigation system ("Galileo"), according to an area of use, a bandwidth, or the like. The term GPS may be interchangeably used with the term "GNSS." A wired communication may include, for example, at least one of a universal serial bus (USB), a high definition multimedia interface (HDMI), recommended standard 232 (RS-232), and a plain old telephone service (POTS). The network 220 in FIG. 2B may include at least one of a telecommunication network such as a computer network (for example, a local area network (LAN) or a wide area network (WAN)), the Internet, and a telephone network.

The processor 202 may include a communication processor (CP). According to an embodiment of the present disclosure, the processor 202 may include one or more of a CPU and an AP. The processor 202 may carry out, for example, operations or data processing related to control and/or communication of at least one other element of the communication device 200. The term "processor" is interchangeable with terms such as "control module," "control unit," and "controller." The processor 202 may control the analog LPF 204 and the A/D converter 205 to receive and/or process a signal.

The memory 203 may include a volatile memory and/or a non-volatile memory. The memory 203 may store, for example, instructions or data related to at least one other element of the communication device 200. According to an embodiment of the present disclosure, the memory 203 may store software and/or a program. The program may include, for example, a kernel, middleware, an application programming interface (API), and/or an application program (or "application"). Although FIG. 2A illustrates that the memory 203 is included in the communication device 200, this is only an example. The memory 203 may be omitted in a process of manufacturing the communication device 200.

Figure 2B:
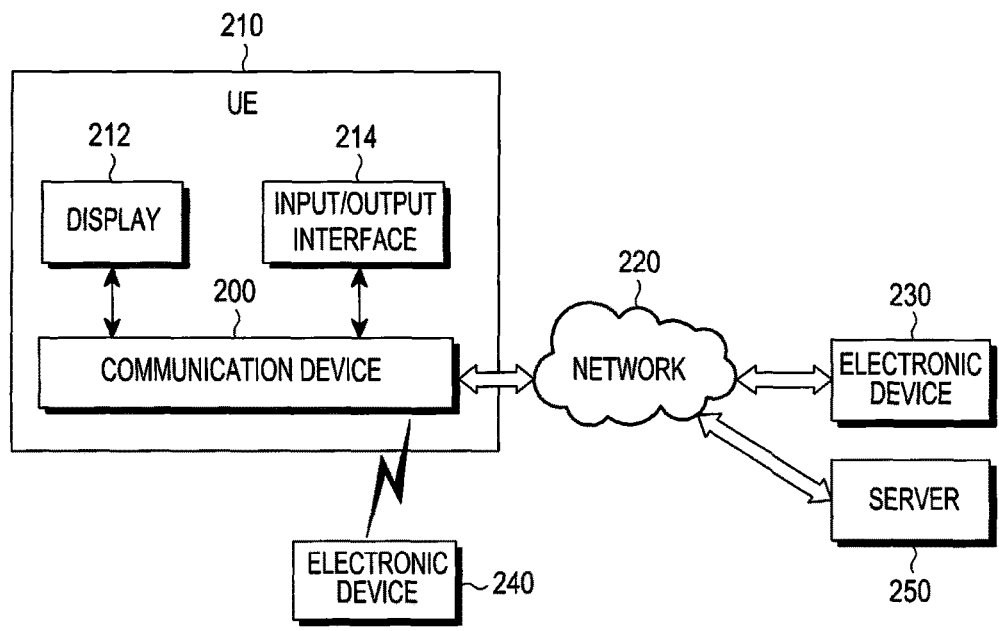
FIG. 2B is a block diagram of a UE including a communication device according to an embodiment of the present disclosure.

FIG. 2B is a block diagram of a UE including the communication device 200 according to an embodiment of the present disclosure.

Referring to FIG. 2B, a UE 210 may include the communication device 200, a display 212, and an input/output interface 214.

The display 212 may include, for example, a liquid crystal display (LCD), a light-emitting diode (LED) display, an organic LED (OLED) display, a microelectromechanical systems (MEMS) display, and an electronic paper display. The display 212 may display, for example, various types of contents (for example, text, images, videos, icons, or symbols) for the user. The display 212 may include a touch screen and receive, for example, a touch input, a gesture input, a proximity input, or a hovering input using an electronic pen or a part of a user's body.

The input/output interface 214 may serve as an interface that may transfer instructions or data, which are input from a user or another external device, to another element(s) of the UE 210. Further, the input/output interface 214 may output instructions or data received from another element(s) of the UE 210 to a user or another external device.

According to an embodiment of the present disclosure, the UE 210 may further include a storage module (for example, a memory) or a processor (for example, an AP).

Figure 3:
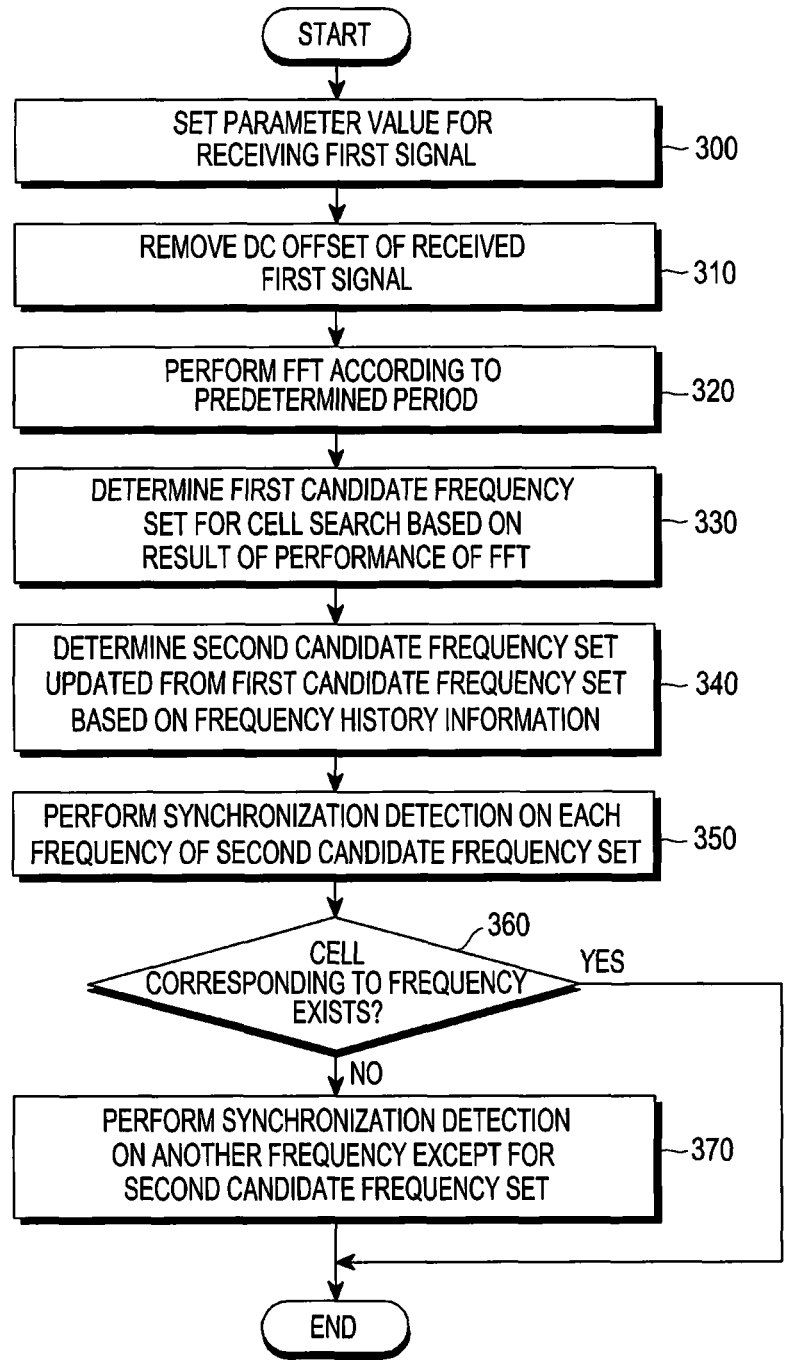
FIG. 3 is a flowchart of a method of controlling a communication device in a first band according to an embodiment of the present disclosure.

FIG. 3 is a flowchart of a method of controlling a communication device in band A according to an embodiment of the present disclosure.

Referring to FIG. 3, the method of controlling the communication device 200 includes step 300 of setting a parameter value for receiving a first signal included in a first band (for example, band A supported by the TD-SCDMA). The band A may have a bandwidth (e.g. 2010 MHz to 2025 MHz) of up to 15 MHz. The parameter value may include at least one of a center frequency value for receiving the first signal (signal in the band A), a bandwidth of the analog LPF 204, and a sampling rate of the A/D converter 205. For example, the center frequency may be set to 2017.4 MHz or 2017.6 MHz, and the bandwidth of the analog LPF 204 may be set to a value greater than or equal to 15 MHz. The sampling rate of the A/D converter 205 may be determined according to a predetermined value to receive the first signal. According to an embodiment of the present disclosure, the analog LPF 204 does not support the bandwidth of 15 MHz, the bandwidth of the analog LPF 204 may be set to a bandwidth that is less than 15 MHz. Step 300 may be controlled by the processor 202.

The method of controlling the communication device 200 according to an embodiment of the present disclosure includes step 310 of estimating and removing a direct current (DC) offset of the received first signal and step 320 of performing a fast Fourier transform (FFT) on the signal, from which the DC offset is removed, according to a predetermined measurement period. Reception power for the first signal received through the FFT may be measured. For example, the FFT may be performed in a unit of 5 msec intervals (that is, 1 subframe), and an average value calculated for M subframes may be obtained as a result of the FFT. Steps 310 and 320 may be controlled by the processor 202.

The method of controlling the communication device 200 according to an embodiment of the present disclosure includes step 330 of determining a first candidate frequency set for a cell search based on the result of the performance of the FFT. The first candidate frequency set may include at least one frequency of which a strength of the measured reception power is greater than or equal to a predetermined strength (or size). For example, referring to FIG. 4, among one or more frequencies included in a reception power order set 400 determined according to step 320, frequencies (for example, $f_1$ to $f_4$) each having a strength greater than or equal to a predetermined reception power strength may be determined as a first candidate frequency set 410. Step 330 may be controlled by the processor 202.

Figure 4:
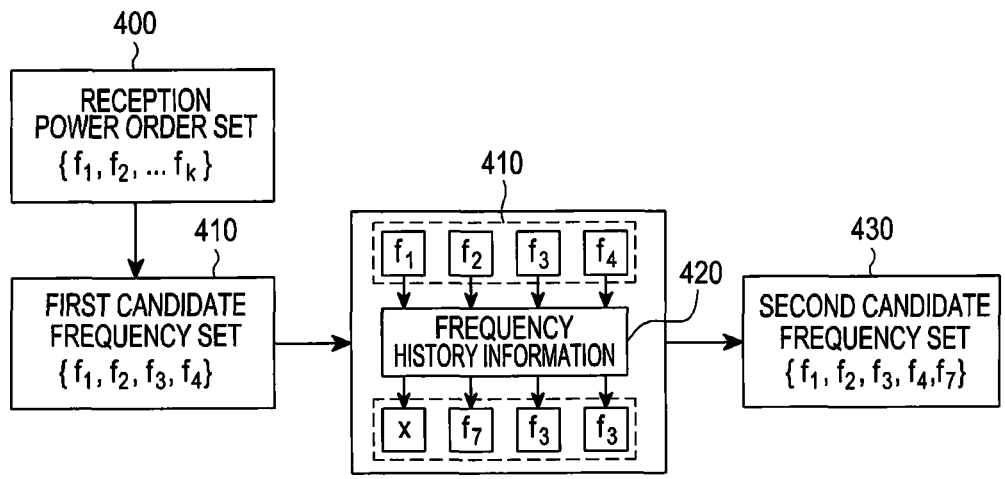
FIG. 4 illustrates determining a first candidate frequency set and a second candidate frequency set according to an embodiment of the present disclosure.
Figure 5:
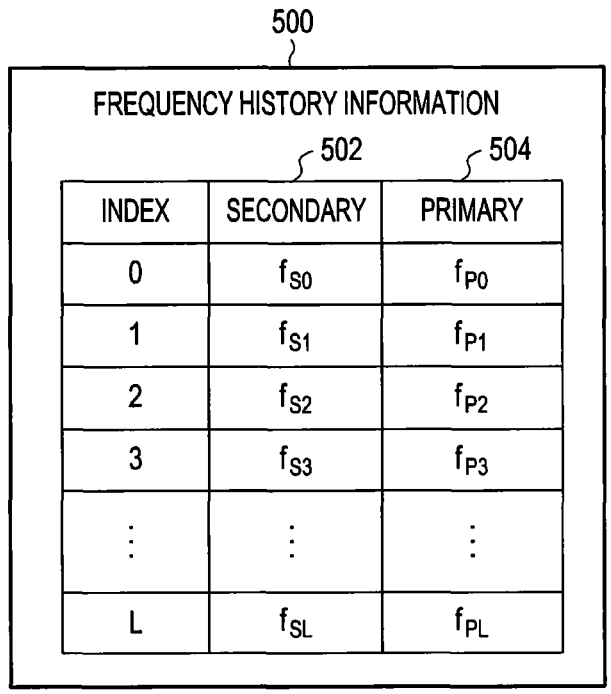
FIG. 5 illustrates frequency history information according to an embodiment of the present disclosure.

The method of controlling the communication device 200 according to an embodiment of the present disclosure includes step 340 of determining a second candidate frequency set updated from the first candidate frequency set based on frequency history information. For example, referring to FIGS. 4 and 5, the frequency history information 420 and 500 may contain a secondary frequency 502 and a primary frequency 504 corresponding to the secondary frequency 502 in a table form as illustrated in FIG. 5, and may be stored in the memory 203. For example, referring to the frequency history information 500 illustrated in FIG. 5, when the secondary frequency is $f_{S0}$, the primary frequency is $f_{P0}$. The frequency history information 420 and 500 may be generated based on a record of communication with an external device through an N-frequency network by the communication device 200 or the UE 210, and stored in the memory 203. Referring to FIG. 4, if each of the frequencies (e.g., $f_1$ to $f_4$) of the first candidate frequency set 410 is the secondary frequency, there may be no history of the primary frequency corresponding to the frequency $f_1$, the primary frequency corresponding to the frequency $f_2$ may be $f_7$, the primary frequency corresponding to the frequency $f_3$ may be $f_3$, and the primary frequency corresponding to the frequency $f_4$ may be $f_3$ with reference to the frequency history information 420. Since the frequency $f_3$ is already included in the first candidate frequency set 410, the processor 202 may add (in other words, update) the frequency $f_7$ to the first candidate frequency set 410 and determine the second candidate frequency set 430.

According to an embodiment of the present disclosure, band types (for example, band A and band F) of the primary frequency 504 and the secondary frequency 502 stored in the frequency history information 420 and 500 may be different from each other. Further, as illustrated in FIG. 4, the primary frequency and the secondary frequency stored in the frequency history information 420 may include the same frequency (that is, aforementioned "frequency $f_3$"). The term "frequency history information" may be interchangeable with the term "N-frequency information."

The method of controlling the communication device 200 according to an embodiment of the present disclosure includes step 350 of performing synchronization detection on the frequencies of the second candidate frequency set and step 360 of determining whether there is a cell corresponding to each frequency included in the second candidate frequency set based on a result of the performance of the synchronization detection. The synchronization detection may be performed according to an order of reception power. In step 360, synchronization detection for each of the frequencies included in the second candidate frequency set may be sequentially performed according to the order, and then it is determined whether the cell actually exists. In this case, when cells corresponding to a plurality of frequencies are detected, a cell corresponding to the frequency having the greatest reception power based on the order may be determined as a connection cell (or a target cell).

Alternatively, according to an embodiment of the present disclosure, in step 360, when a cell corresponding to one frequency is detected in the process of performing the synchronization detection according to the order of the greatest reception power, it may be determined whether the cell actually exists based on a result of the synchronization detection without the synchronization detection for the remaining frequencies. In this case, the detected cell may be determined as the connection cell (in other words, the target cell).

According to an embodiment of the present disclosure, the synchronization detection for the frequency (for example, the "frequency $f_7$") added to the second candidate frequency set 430 may be performed last, but the present disclosure is not limited thereto. The processor 202 may assign a highest priority to an added frequency to perform the synchronization detection first, but other methods may be applied.

The method of controlling the communication device 200 according to an embodiment of the present disclosure includes step 370 of, if it is determined that there is no corresponding cell based on the result of the synchronization detection, performing the synchronization detection on the other frequencies except for at least one frequency included in the second candidate frequency set among the frequencies included in the reception power order set 400. Step 370 may be controlled by the processor 202.

As described above, when reception power of all carrier frequencies are measured for the cell search in the TD-SCDMA system, reception power of a total of 261 (e.g. 68+193) carriers of band A and band F should be measured. If reception power is measured at least in units of 5 msec, it would take 1.305 sec for the cell search. However, according to the method of the present disclosure, a time required to measure the reception power for all of band A and band F is 2 (the number of bands)*5 (a length of the subframe)*M (the averaging number of the subframes) msec, which is less than the time required for performing the cell search according to a conventional method, thereby reducing power consumption. For example, when it is assumed that the number of average subframes is 10, the time required for measuring the reception power may be 100 msec. This is a time reduced to be less than or equal to $\frac{1}{10}$ of 1.305 sec.

Figure 6:
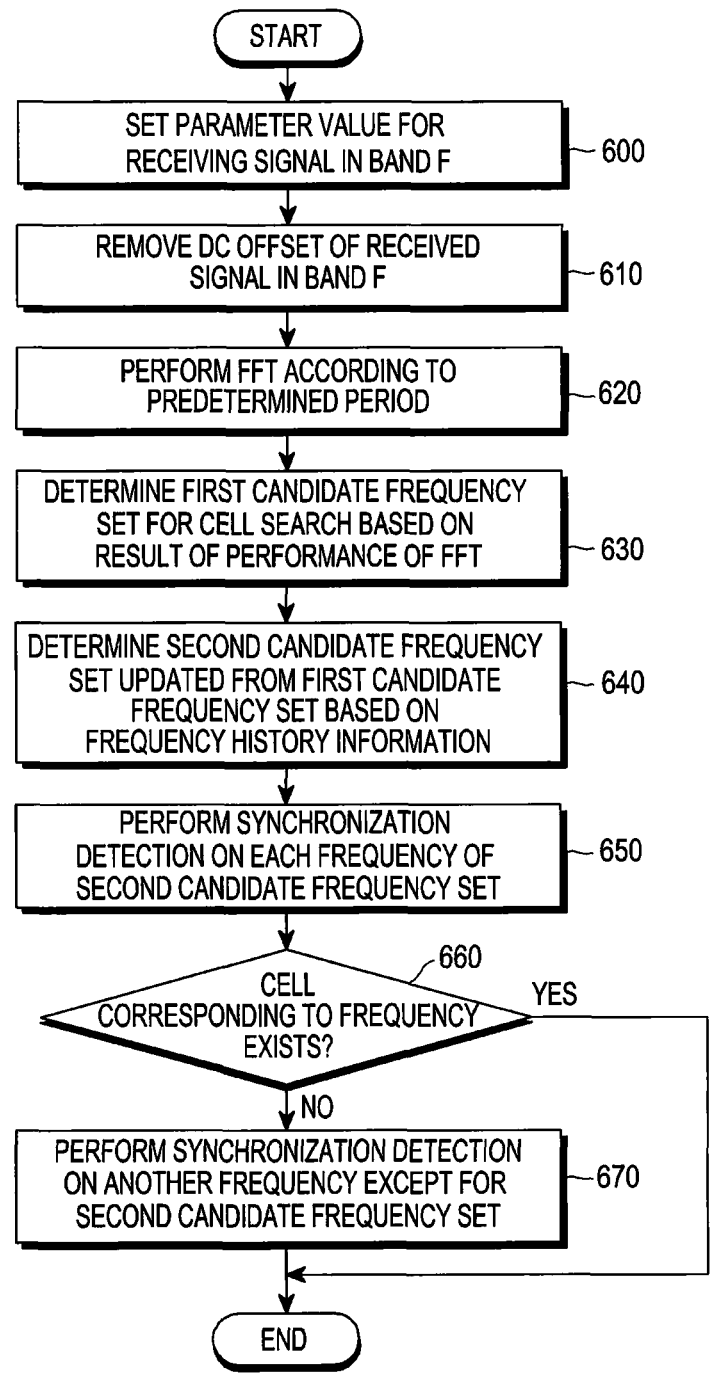
FIG. 6 is a flowchart of a method of controlling a communication device in band F according to an embodiment of the present disclosure.

FIG. 6 is a flowchart of a method of controlling a communication device in band F according to an embodiment of the present disclosure. The band F which is supported by the TD-SCDMA may have a bandwidth (e.g., 1880 MHz to 1920 MHz) of up to 40 MHz.

Referring to FIG. 6, the description of FIG. 3 may be equally applied to the method of controlling the communication device in the band F according to an embodiment of the present disclosure, except that the "first signal" and "first band" in step 300 of FIG. 3 is changed respectively to the "signal in band F" and "band F" in step 600 of FIG. 6. In step 600, the center frequency may be set to 1900 MHz and the bandwidth of the analog LPF 204 may be set to a value greater than or equal to 40 MHz. The sampling rate of the A/D converter 205 may be determined according to a predetermined value to receive the signal in the band F. Further, the bandwidth of the analog LFP 204 may be set to a bandwidth less than 40 MHz. Step 600 may be controlled by the processor 202.

The communication device according to an embodiment of the present disclosure may process the first signal (i.e. signal in band A) according to the steps illustrated in FIG. 3 and then process the signal in the band F according to the steps illustrated in FIG. 6. Alternatively, the communication device may process the signal in the band F according to the steps illustrated in FIG. 6 and then process the first signal according to the steps illustrated in FIG. 3.

The term "module" as used herein may, for example, indicate a unit including one of hardware, software, and firmware or a combination of two or more of them. The term "module" may be interchangeably used with, for example, the terms "unit," "logic," "logical block," "component," or "circuit." The term "module" may be a minimum unit of an integrated component element or a part thereof. The term "module" may indicate a minimum unit for performing one or more functions or a part thereof. The term "module" may indicate a module mechanically or electronically implemented. For example, the term "module" may include at least one of an application specific integrated circuit (ASIC), a field programmable gate array (FPGA), and a programmable-logic device for performing operations which are known or will be developed.

According to an embodiment, at least some of the devices (for example, modules or functions thereof) or the method (for example, in steps or operations) may be implemented by a command stored in a non-transitory computer-readable storage medium in a programming module form. An instruction, when executed by a control module (e.g., the processor 202), may cause one or more control modules to execute a function corresponding to the instruction. The non-transitory computer-readable storage medium may be, for example, the memory 203.

A non-transitory computer-readable storage medium may include a hard disk, a floppy disk, magnetic media (e.g., a magnetic tape), optical media (e.g., a compact disk read only memory (CD-ROM) and a digital versatile disc (DVD)), magneto-optical media (e.g., a floptical disk), a hardware device (e.g., a ROM, a random access memory (RAM), a flash storage module), and the like. In addition, the program instructions may include high level language code, which may be executed in a computer by using an interpreter, as well as machine code generated by a compiler. The aforementioned hardware device may be configured to operate as one or more software modules in order to perform the operation of the present disclosure, and vice versa.

A programming module according to an embodiment of the present disclosure may include one or more of the aforementioned components or may further include other additional components, or some of the aforementioned components may be omitted. Operations executed by a module, a programming module, or other component elements according to an embodiment of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to facilitate understanding of the present disclosure, and are not intended to limit the scope of the present disclosure. Therefore, it is intended that all modifications and changes or modified and changed forms based on the present disclosure fall within the scope of the present disclosure as defined by the appended claims and their equivalents.

What is claimed is:

1. A communication device operating in a wireless communication system, the communication device comprising:
   a memory configured to store frequency history information; and
   a processor electrically connected to the memory,
   wherein the processor is configured to:
   measure reception power of at least one of a plurality of first signals included in a first band,
      determine a first candidate frequency set according to a strength of the reception power,
      determine a second candidate frequency set from the first candidate frequency set based on the frequency history information, and
      determine whether a cell corresponding to a second frequency included in the second candidate frequency set exists,
   wherein if a first frequency in the first candidate frequency set is included in the frequency history information, a primary frequency included in the frequency history information is added to the first candidate frequency set so as to determine the second candidate frequency set.

2. The communication device of claim 1, wherein the first band is one of band A and band F according to a time division synchronous code division multiple access (TD-SCDMA) system.

3. The communication device of claim 1, wherein the first candidate frequency set includes at least one frequency having a strength of the reception power that is greater than or equal to a predetermined strength.

4. The communication device of claim 1, wherein the frequency history information includes information on the primary frequency and information on the secondary frequency corresponding to the primary frequency in an N-frequency network.

5. The communication device of claim 1, wherein the processor is further configured to measure the reception power based on a result of a performance of a fast Fourier transform (FFT).

6. The communication device of claim 1, wherein the processor is further configured to determine whether the cell corresponding to the second frequency included in the second candidate frequency set exists by performing synchronization detection on the second frequency included in the second candidate frequency set.

7. The communication device of claim 1, wherein the primary frequency is mapped to a secondary frequency in the frequency history information, the secondary frequency in the frequency history information being identical to the first frequency.

8. A method of controlling a communication device operating in a wireless communication system, the method comprising:
   receiving at least one of a plurality of first signals included in a first band;
   measuring reception power of the at least one of the plurality of first signals;
   determining a first candidate frequency set according to a strength of the reception power;
   determining a second candidate frequency set updated from the first candidate frequency set based on frequency history information; and
   determining whether a cell corresponding to a second frequency included in the second candidate frequency set exists,
   wherein if a first frequency in the first candidate frequency set is included in the frequency history information, a primary frequency included in the frequency history information is added to the first candidate frequency set so as to determine the second candidate frequency set.

9. The method of claim 8, wherein the first band is one of band A and band F according to a time division synchronous code division multiple access (TD-SCDMA) system.

10. The method of claim 8, wherein the first candidate frequency set includes at least one frequency having a strength of the reception power that is greater than or equal to a predetermined strength.

11. The method of claim 8, wherein the frequency history information includes information on the primary frequency and information on the secondary frequency corresponding to the primary frequency in an N-frequency network.

12. The method of claim 8, wherein the reception power is measured based on a result of a fast Fourier transform (FFT).

13. The method of claim 8, wherein it is determined whether the cell corresponding to the second frequency included in the second candidate frequency set exists by performing synchronization detection on the second frequency included in the second candidate frequency set.

14. The method of claim 8, wherein the primary frequency is mapped to a secondary frequency in the frequency history information, the secondary frequency in the frequency history information being identical to the first frequency.

15. A user equipment (UE) operating in a wireless communication system, the UE comprising:
   a display;
   an input or output interface; and
   a communication device,
   wherein the communication device comprises:
   a memory configured to store frequency history information; and
   a processor electrically connected to the memory,
   wherein the processor is configured to:
      measure reception power of at least one of a plurality of first signals included in a first band,
      determine a first candidate frequency set determined according to a strength of the reception power, determine a second candidate frequency set updated from the first candidate frequency set based on the frequency history information, and determine whether a cell corresponding to a second frequency included in the second candidate frequency set exists, wherein if a first frequency in the first candidate frequency set is included in the frequency history information, a primary frequency included in the frequency history information is added to the first candidate frequency set so as to determine the second candidate frequency set.

16. The UE of claim 15, wherein the first band is one of band A and band F according to a time division synchronous code division multiple access (TD-SCDMA) system.

17. The UE of claim 15, wherein the first candidate frequency set includes at least one frequency having a strength of the reception power greater than or equal to a predetermined strength.

18. The UE of claim 15, wherein the frequency history information includes information on the primary frequency and information on the secondary frequency corresponding to the primary frequency in an N-frequency network.

19. The UE of claim 15, wherein the processor is further configured to determine whether the cell corresponding to the second frequency included in the second candidate frequency set exists by performing synchronization detection on the second frequency included in the second candidate frequency set.

20. The UE of claim 15, wherein the primary frequency is mapped to a secondary frequency in the frequency history information, the secondary frequency in the frequency history information being identical to the first frequency.

* * * * *